United States Patent [19]

Sasayama et al.

[11] Patent Number: 4,708,480

[45] Date of Patent: Nov. 24, 1987

[54] SOLID-STATE OPTICAL INTERFEROMETER

[75] Inventors: Takao Sasayama; Shigeru Oho; Atsushi Kanke; Takanori Shibata, all of Hitachi; Akira Endo, Mito, all of Japan

[73] Assignee: Hitachi, Ltd., Tokyo, Japan

[21] Appl. No.: 661,454

[22] Filed: Oct. 16, 1984

[30] Foreign Application Priority Data

Oct. 17, 1983 [JP] Japan ................. 58-192494

[51] Int. Cl.⁴ ........................................... G01C 19/64
[52] U.S. Cl. .................................................. 356/350
[58] Field of Search ........................ 356/345, 350; 350/96.13, 96.17

[56] References Cited

U.S. PATENT DOCUMENTS 4,273,445 6/1981 Thompson et al. ................. 356/350
4,433,895 2/1984 Puech et al. ..................... 350/96.13

FOREIGN PATENT DOCUMENTS 0182507 10/1983 Japan ................................. 356/350
0032870 2/1984 Japan ................................. 356/350

OTHER PUBLICATIONS

"Efficient Acoustooptic Diffraction in Crossed Channel Waveguides and Resultant Integrated Optic Module", Tsai et al, 1982 IEEE Ultrasonics Symposium, pp. 422–425.

Primary Examiner—Davis L. Willis
Assistant Examiner—S. A. Turner
Attorney, Agent, or Firm—Antonelli, Terry & Wands

[57] ABSTRACT

In a solid-state optical interferometer having a light path composed of a loop-shaped optical fiber and a solid-state light wave guide optically coupled to said optical fiber, electrodes for producing a surface acoustic wave (SAW) are formed as a pair on a surface of a substrate on which said solid-state light wave guide is formed, and said surface acoustic wave is used to apply optical modulation to a light beam passing through said solid-state light wave guide.

10 Claims, 26 Drawing Figures (a)

(b)

(c)

SOLID-STATE OPTICAL INTERFEROMETER

The present invention relates to an interferometer in which an optical fiber is used as the light path and in particular to a solid-state interferometer in which components of the light path excepting the optical fiber are solidified and which is useful for detecting various physical quantities such as an angular velocity.

Interferometers are used for observing the light interference. In a so-called bibeam interferometer, a beam of light emitted from a light source is divided into two beam portions. These two beam portions are combined into a beam after being passed through light paths having different conditions. From the interference between two beam portions, the physical change in the light path is measured. The bibeam interfermeters have been used for precisely measuring various physical quantities for a long time. In recent years, optical fibers are used as light paths. Since the size of the entire bibeam interferometer can thus be reduced, they have recently been used in even wider measurement fields.

FIGS. 1 to 3 illustrate some methods of such interferometers utilizing optical fibers.

FIG. 1 shows a so-called ring interferometer. An optical fiber (hereafter referred to as OF) is wound in a loop form to make an OF ring R. The beam emitted from a laser source L is divided into two beam portions by a beamsplitter BS1 including a half mirror. One portion of the beam is directed into one end of the OF of the ring R and the other portion of the beam is directed into the other end of the OF. Two portions of the beam after travelling through the OF of the ring R are combined together by the beamsplitter BS1. The resultant combined beam is splitted by a beamsplitter BS2 to be detected by a detector D. The detector D comprises a photodiode, for example.

When all of the components including the OF ring R are stopped, two beam portions directed into ends of the OF of the ring R travel around light paths formed by the same OF and are then combined together to be supplied to the detector D. Since there is no phase difference between two beam portions, therefore, no interference is incurred.

When the OF ring R is rotated at an angular velocity $\Omega$, the path length of the OF of the ring R appears to be lengthened for one beam portion travelling around the ring R in the direction of angular velocity $\Omega$ while the path length appears to be shortened for the other beam portion travelling around the ring R in the counterclockwise direction. Accordingly, there exists phase difference between two beam portions which have been combined by the beam splitter BS1, resulting in interference.

Therefore, the angular velocity $\Omega$ can be detected by detecting the change in light quantity caused by the interfernce using the detector D. Accordingly, the ring interferometer can be used as a gyro, for example. Letter P denotes a polarizer.

FIG. 2 shows a Mach interferometer (also referred to as Mach-Zenda interferometer). Two OF rings R1 and R2 comprise OF's having identical lengths. A beam of light emitted from a laser source L is divided into two portions by a beamsplitter BS1. Two beam portions thus split are directed into OF rings R1 and R2, respectively. Two beam portions after travelling around OF rings R1 and R2 are recombined by a beam splitter BS2 to be directed into a detector D.

While the physical condition of the OF ring R1 is held the same as that of the OF ring R2, the time required for one beam portion to travel around the ring R1 is completely the same as the time required for the other beam portion to travel around the ring R2. Therefore, there is no phase difference between two beam portions after are recombined by the beam splitter BS2, no interference being caused.

When there is a difference between the physical conditions of the OF rings R1 and R2, a difference is incurred between light travelling times of these two rings. The interference caused by the phase difference is detected by the detector D.

Therefore, it is possible to detect a physical quantity from the interference provided that one of the OF rings, say, the ring R2 is held in a fixed physical condition as a reference ring and the other OF ring R1 is provided with the physical quantity to be measured as a detection ring.

If the physical quantity to be measured is a current or a magnetic field, a change in the index of refraction of the OF ring R1 caused by the Faraday effect produces interference. If the physical quantity to be measured is vibration such as underwater sound or temperature, a change in the refraction index caused by the change in stress produces interference. In either case, the interference can be detected.

FIG. 3 shows a Michelson interferometer, in which reflected beam portions which are returned from ends of two OF rings R1 and R2 are recombined by a beamsplitter BS to produce interference. If the OF ring R1 is used as a detection probe and a fluid is adopted as the reflection object at the end of the OF ring R1, the current speed of the fluid can be measured. If a vibrating body is adopted as the reflection object, its amplitude displacement or vibration mode can be detected. If the OF ring R1 is also terminated by a mirror, the interferometer can be used similarly to the Mach interferometer for measuring the temperature, for example.

Thus, these interferometers make it possible to measure various physical quantities and can be used as various sensors. The prior art of interferometric gyrometer utilizing phase modulation is disclosed in U.S. Pat. No. 4,286,878 and U.S. Pat. No. 4,265,541.

In conventional interferometers, however, the light path excepting the OF is formed by the beam splitter comprising the half mirror as evident from FIGS. 1 to 3. Accordingly, each of these interferometers has such a structure that the concept of an optical bench used for an optical experiment is applied as it is thereto. Thus, its size reduction is difficult and its construction and adjustment require a great deal of skill. Even after the construction and adjustment, the optical system is apt to get out of order due to a slight change in vibration or temperature. Thus, it is difficult to maintain precision. As a result, it is extremely difficult to provide each of the interferometers in form of various modular sensors.

As disclosed in Japanese patent application Laid-Open Nos. 94687/81 and 113297/82, for example, the above described interferometers can detect an angular velocity and hence can be used as gyros. As increasing attention is paid to automobile navigation system in recent years, application thereto becomes an important problem. Angular velocity detection by the ring interferometer is carried out by using the Sagnac effect in the OF ring as the basic principle. Accordingly, the output of the detector of the ring interferometer has a raised cosine type characteristic with respect to angular velocity. This characteristic is extremely undesirable when a wide dynamic range is required.

For example, a gyro used in the automobile navigation system requires a wide dynamic range amounting to six figures. In a gyro using a ring interferometer (hereafter referred to as optical fiber gyro or OF gyro), it is necessary to use an optical modulator as the interferometer and control the output of the optical modulator by the zero method in order to expand the dynamic range. Such a zero method is disclosed in Japanese patent application Laid-Open No. 93010/80.

In a interferometer for an OF gyro, therefore, an optical modulators is required for portions of the light path excepting the OF light path. This is also true of interferometers other than ring interferometers. As a result, the structure of the light path apart from OF become even more complicated, and the above described drawbacks become more and more conspicuous.

An object of the present invention is to provide a solid-state interferometer having an interference optical system which can be easily constructed and adjusted and which hardly gets out of order after the construction and adjustment and having excellent mass productivity because of modular structure of the entire interferometer.

In accordance with the present invention, therefore, in the interferometer having an OF as a part of the light path, a solid-state light wave guide is used for at least a part of the optical system apart from the OF light path, and this solid-state light wave guide is made in common with the substrate to integrate the optical modulator.

In other words, the wave guide and the modulator are solidified (i.e., integrated). Once the Bragg diffraction angle ($2\theta_B$) is set during production, therefore, the Bragg diffraction angle never gets out of order thereafter. Thus, the interferometer has a feature of stable operation.

The above and other objects, features and advantages of the present invention will be apparent from the following detailed description of the preferreed embodiments of the present invention in connection with the accompanying drawings, in which.

Solid-state interferometers according to the present invention will now be described by referring to illustrated embodiments.

Figure 1:
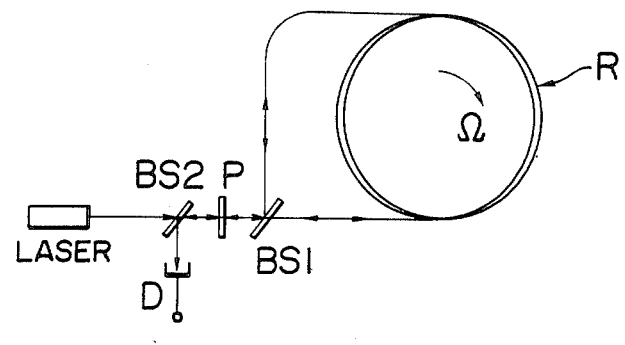
FIG. 1 shows the fundamental configuration of a conventional ring interferometer using an optical fiber.
Figure 4:
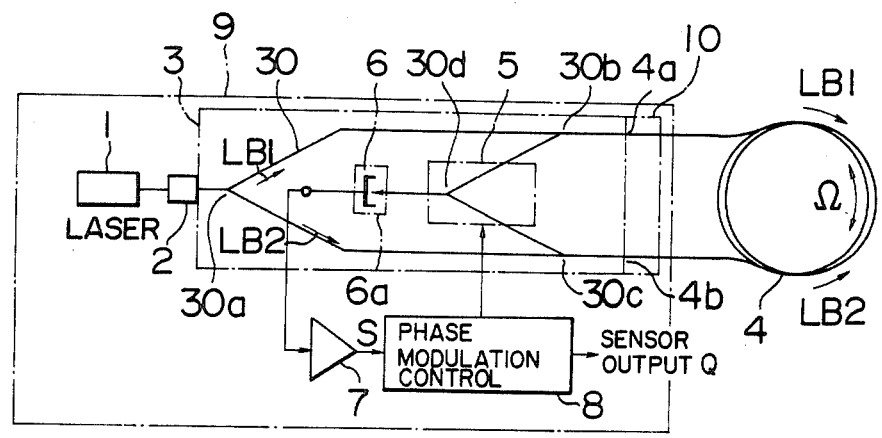
FIG. 4 shows the configuration of an embodiment of a ring interferometer according to the present invention.

FIG. 4 shows an embodiment of the present invention, which has been obtained by applying the present invention to the ring interferometer illustrated in FIG. 1. The interferometer illustrated in FIG. 4 includes a laser 1, an isolator 2, a solid-state light wave guide substrate 3, a loop-shaped OF ring 4, a surface acoustic wave element 5, a photodetector 6, a buffer amplifier 7, a phase modulation control circuit 8, an assembly substrate 9, and a coupling portion 10. A solid-state light wave guide 30 is formed on the substrate 3. Light beam splitting portions 30a, 30b, and 30c as well as a light combination portion 30d are formed on the solid-state light wave guide 30. At ends 4a and 4b of the OF ring 4, the OF ring 4 is coupled to the solid-state light wave guide 30.

A semiconductor laser is used as the laser 1 to emit a monochromatic light having a high convergence property.

As the isolator 2, an isolator using the Faraday effect, for example, is adopted. The isolator 2 functions to prevent the beam returned from the OF ring 4 from entering the laser 1.

The transparent solid-state light wave guide substrate 3 is made of ferroelectric such as lithium niobate LiNbO$_3$. The substrate 3 is provided for the solid-state light wave guide 30 and for the surface acoustic wave element 5 to be formed thereon as will be later described in detail.

The OF ring 4 functions in the same way as the OF ring R of the prior art illustrated in FIG. 1.

The surface acoustic wave element 5 is also referred to as a surface elastic wave element. The element 5 functions to propagate surface acoustic waves on one surface of the solid-state light wave guide substrate 3, on which the solid-state light wave guide 30 has been formed, and functions to form an optical modulator using Bragg diffraction as will be later described in detail.

The photodetector 6 is a photoelectric conversion element such as a photodiode and is fixed in a dent or hole 6a provided on the solid-state light wave guide substrate 3. The photodetector 6 functions to detect a light beam emitted from the solid-state light wave guide 30.

The buffer amplifier 7 functions to convert a current signal fed from the photodetector 6 to a voltage signal.

The phase modulation control circuit 8 functions to control the phase of the drive signal which has been supplied to the surface acoustic wave element 5 in accordance with the signal fed from the photodetector 6 and produce the sensor output by the zero method, as will be described later in detail.

The assembly substrate 9 is made of ceramics such as alumina porcelain and functions to assemble the optical system apart from the OF ring 4 into a unit as will be described later in detail along with the coupling portion 10. By using the zero method, a measurement output can be obtained with high precision.

Figure 5:
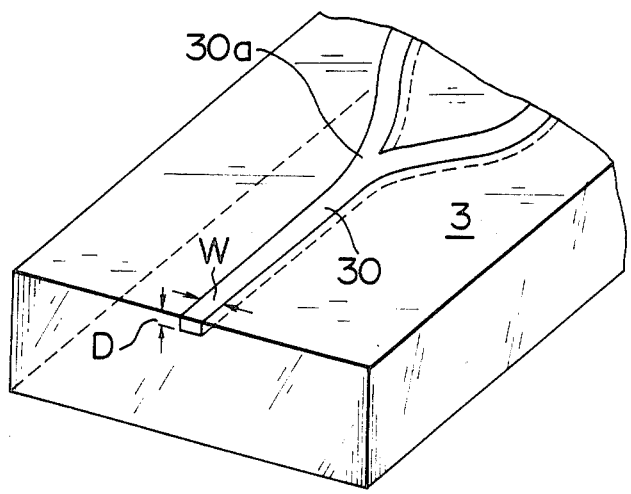
FIG. 5 is a schematic drawing for illustrating an embodiment of a light wave guide.

FIG. 5 shows one embodiment of the solid-state light wave guide substrate 3 along with the solid-state light wave guide 30 and the light division portion 30a formed thereon in detail.

The embodiment illustrated in FIG. 5 is referred to as light wave guide of Ti diffused LiNbO₃. As the substrate 3, a LiNbO₃ crystal quarried in the Z cut is used. On the surface of the substrate 3, titanium Ti is diffused to form the light wave guide 30. At first, a titanium film having the surface shape as the light wave guide to be made is formed on the surface of the substrate 3 by using a method such as sputtering. The titanium film is subjected to thermal diffusion process to diffuse titanium into the substrate. Thus, a part of the substrate ranging from the titanium film to a predetermined depth will have a refractive index which is slightly different from that of the substrate itself, the light wave guide 30 being formed. At this time, the light beam splitting portion 30a can also be produced only by forming the titanium film in accordance with the shape of the portion 30a. The light combination portions 30b to 30d can also be made in the same way as the light division portion 30a.

The solid-state light wave guide thus formed is 5 μm in width W and several hundred Å in depth D, for example. The relationship between the solid-state light wave guide 30 and the OF core 40 is illustrated in FIG. 6.

Figure 6:
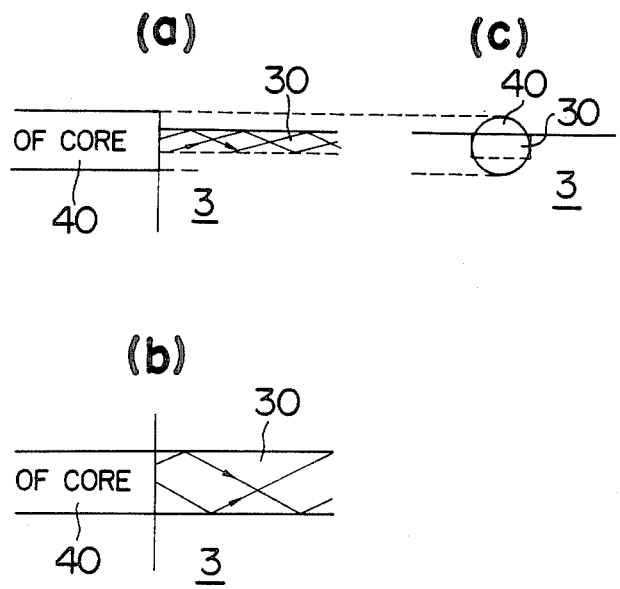
FIG. 6 is a schematic drawing for illustrating a coupling portion between the optical fiber and the light path.

FIG. 6 shows the coupling state between the OF ring 4 and the solid-state light wave guide 30 at ends 4a and 4b of the OF ring 4. The OF is assumed to be 125 μm in clad diameter and 5 μm in core diameter. FIG. 6(a) is a side view, FIG. 6(b) is a top view, and FIG. 6(c) is a front view. It is understood that a light can be propagated continuously by confronting an end face of the OF core 40 with an end of the solid-state light wave guide 30 kept in contact with each other.

Figure 7:
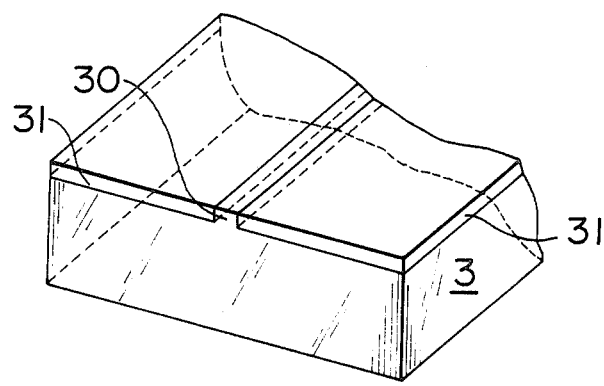
FIG. 7 is a schematic drawing for illustrating another embodiment of a light wave guide.

FIG. 7 shows another embodiment of a solid-state light wave guide 30, which is referred to as bridge type or wedge type. While leaving a part of the surface of the substrate 3 which is to be formed as the light wave guide, the environs thereof is removed by a method such as ion milling. Onto the part thus removed, filling layers 31 comprising material having a suitable refractive index such as polyimide resin are placed to form the light wave guide 30. When the solid-state light wave guide illustrated in FIG. 7 is used, it is not possible to obtain light propagation by means of reflection in the thickness direction as illustrated in FIG. 6(a).

The OF ring 4 is obtained by winding the above described OF, which has a clad diameter of 125 μm, a core diameter of 5 μm, and a length of approximately 500 m, around a ring which is approximately 30 cm in diameter. The OF ring 4 provides light beams propagating in both directions with the Sagnac effect.

Figure 8:
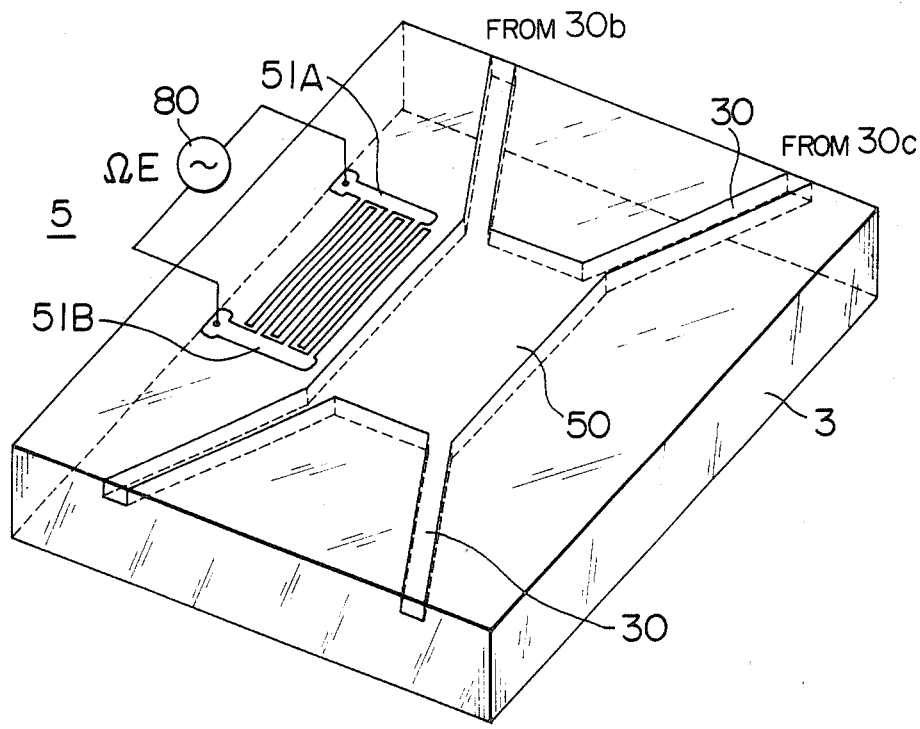
FIG. 8 is a schematic drawing for illustrating an embodiment of an optical modulator.

FIG. 8 shows an embodiment of a surface acoustic wave element (hereafter referred to as SAW element) in detail, and depicts a part of the substrate 3 illustrated in FIG. 4. In FIG. 4, reference numeral 50 denotes a diffraction portion and reference numerals 51A and 51B denote comb electrodes.

Similarly to the solid-state light wave guide 30, the diffraction portion 50 is formed on the surface of the substrate 3 as diffused titanium or a ridge.

The comb electrodes 51A and 51B are combshaped electrodes entering each other and formed on the surface of the substrate 3 by means of evaporation or sputtering. Upon receiving a high frequency drive signal fed from a reference oscillator 80 which is included in the phase modulation control circuit 8, the comb electrodes 51A and 51B function to produce a surface acoustic wave (referred to as SAW) and propagate the wave into a region including the diffraction portion 50.

Operation of the SAW element 5 will now be described in more detail by referring to FIG. 9.

When the high frequency signal from the reference oscillator 80 is supplied to the electrodes 51A and 51B, a high frequency electric field is produced between combs of the electrodes. Due to the piezoelectric effect of the high frequency electric field, the surface of the substrate 3 contracts and expands locally. The SAW thus produced is propagated through the diffraction portion 50.

Figure 9:
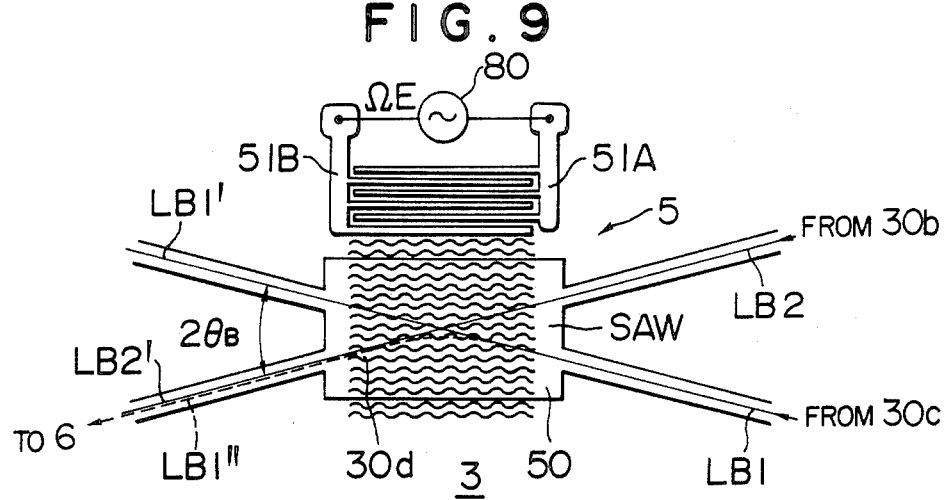
FIG. 9 is a drawing for illustrating the operation of the optical modulator.

If a light beam LB1 is then applied to the diffraction portion 50 as illustrated in FIG. 9, a part of the light beam LB1 is subjected to Bragg diffraction caused by stress which is generated near the surface of the substrate 3 by the SAW. The Bragg diffraction light LB1″ thus produced proceeds in a direction which forms a predetermined angle $2\theta_B$ with respect to a light beam LB1′ which proceeds straight without being subjected to diffraction.

The angle $2\theta_B$ is defined as:

$$\sin \theta_B = \frac{1}{2} \cdot \frac{K}{k} = \frac{1}{2} \cdot \frac{\lambda}{\Lambda} \qquad (1)$$

where:
K=the number of SAW waves
k=wavelength of SAW
Λ=the number of the light
r=wavelength of the light Assuming that the diffraction light LB1″ has a frequency $\omega_2$, $\omega_2$ is displaced from the frequency $\omega_1$ of the original light beam LB1 by the frequency $\Omega E$ of the SAW as:

$$\omega_2 = \omega_1 \pm \Omega E \quad (2)$$

The frequency $\Omega E$ of the SAW is the same as the frequency of the drive signal fed from the reference oscillator 80 to electrodes 51A and 51B. In the SAW element, therefore, the light beam LB1 is subjected to frequency modulation by the signal fed from the reference osillcator 80, the function of the optical modulator being realized. The sign $\pm$ in the expression (2) depends upon the propagation direction of the SAW and the incident direction of LB1. In the above described example, the sign is $+$.

At the same time, another light beam LB2 is applied to the diffraction portion 50 at a predetermined angle with respect to the light beam LB1. If the incident direction of the light beam LB2 with respect to the light beam LB1 is set to $2\theta_B$, it is possible to combine the diffracted light LB1″ with the light beam LB2 and take the combined light out of the diffraction portion 50. Thus, the function of the light combination portion 30d is fulfilled. In this embodiment, the light beam LB1′ and a light beam which is produced by diffraction of the light beam LB2 and is not illustrated in FIG. 9 are discarded without being used.

Figure 10:
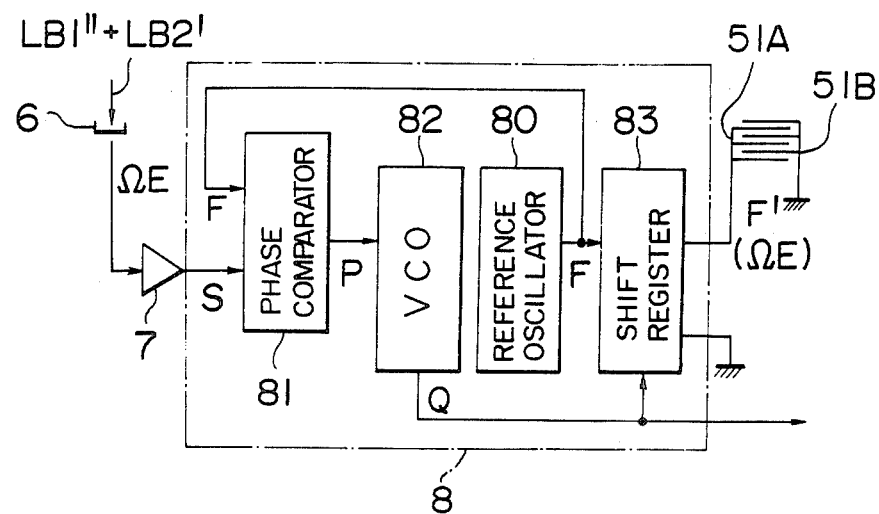
FIG. 10 is a block diagram of an embodiment of a phase modulation control circuit.

FIG. 10 shows one embodiment of the phase modulation control circuit 8. As already described, reference numeral 80 denotes a high frequency reference oscillator for supplying the drive signal F to the electrodes 51A and 51B of the SAW element 5.

A phase comparator 81 functions to compare the phase of a detected signal S, which is supplied from the photodetector 6 to the buffer amplifier 7, with that of the output F of the reference oscillator 80 to produce a signal P representing the phase difference.

A voltage controlled oscillator (hereafter referred to as VCO) 82 functions to produce an output signal Q having a frequency corresponding to the phase comparison signal P.

A shift register 83 produces a shift output signal F′ in response to a shift input signal F and a shift clock signal Q. The shift register 83 outputs the signal in F′ which lags behind the signal F by a predetermined delay time, i.e., a predetermined lag phase. The phase lag can be arbitrarily controlled by the frequency of the signal Q. As a result, the shift register 83 operates as a variable phase shifter.

Operation for detecting an angular velocity in the embodiment illustrated in FIG. 4 will now be described.

The light beam (hereafter abbreviated as LB) fed from the laser 1 passes through the isolator 2 and enters the solid-state light wave guide (hereafter abbreviated as SLG) 30 formed on the solid-state light wave guide substrate 3. The light beam is then divided into two beam portions LB1 and LB2 by the light beam splitting portion 30a formed on the SLG 30. The LB1 passes through the beam splitting division portion 30b as it is and is directed into the OF of the ring 4 through one end 4a of the OF in the OF ring 4 located in the coupling portion 10. After travelling around the OF ring 4 in the clockwise direction (in FIG. 4), the LB1 reenters the SLG substrate 3 through the other end 4b of the OF ring 4. The LB1 is then directed into the diffraction portion 50 (FIGS. 8 and 9) of the SAW element 5 through the light beam splitting portion 30c. The resultant Bragg diffraction light LB1″ is supplied from the SAW to the photodetector 6. On the other hand, the LB2 passes through the light beam splitting portion 30c and is directed into the OF ring 4 through the end 4b. After travelling around the OF ring 4 in the counter-clockwise direction, the LB2 reenters the SLG 30 through the end 4a. After being divided by the light beam splitting portion 30b, the LB2 is directed into the diffraction portion 50 of the SAW element 5 to become LB2′ as it is. The LB2′ is combined with the LB1″ and enters the photodetector 6. As described before, a part of LB1 or LB2 which is divided at the light beam splitting portion 30b or 30c to be directed into the light beam splitting portion 30a is prevented from returning to the laser 1 by the isolator 2.

Among the LB1″ and LB2′ thus directed into the photodetector 6, the LB1″ is subjected to frequency modulation in the SAW element 5 as described before. The frequency $\omega_2$ of the LB1″ is deviated from the frequency $\omega_1$ of the original LB1 and LB2 by $\Omega E$. Because of the frequency difference $\Omega E$ between the LB1″ and LB2′, a beat signal having a frequency $\Omega E$ is produced between them. Thus, the output signal S (FIG. 10) of the phtodetector 6 has a frequency $\Omega E$. The phase of the signal S is compared with that of the output signal F of the reference oscillator 80.

If the OF ring 4 is not rotated and its angular rotation speed $\Omega$ is zero, any phase difference due to the Sagnac effect is not produced between two counterpropagating beams LB1 and LB2. Accordingly, the phase difference between the LB1 and LB2 when directed into the SAW element 5 depends upon constants of this system and can be practically considered to be zero.

If the OF ring 4 is rotated at an angular velocity $\Omega_1$ [rad/S], the Sagnac effect produces a phase difference $\Delta\theta$ between beams LB1 and LB2 counterpropagating through the OF ring 4 as:

$$\Delta\theta = \frac{4AN}{\lambda C}\Omega_1 = \frac{2LR}{\lambda C}\Omega_1 [rad] \quad (3)$$

where:
A = area surrounded by the OF ring [m²]
N = the number of turns on the OF ring 4
L = length of OF in the OF ring 4 [m]
R = radius of the OF ring 4 [m]
$\lambda$ = wavelength of laser light [m]
C = light velocity ($= 3 \times 10^8$ [m/S])
When L = $10^3$ m, R = 0.3 m, and $\lambda = 0.83 \times 10^{-6}$ m, for example, it follows that:

$$\Delta\theta \simeq 1.2 \, \Omega_1 \quad (4)$$

Such phase relationship between the LB1 and LB2 is completely preserved in the LB1″ and LB2′ produced after passing through the SAW element 5. Further, the relationship is also preserved in the beat signal having a frequency $\Omega E$ produced between the LB1″ and LB2′.

If the phase difference between the LB1 and LB2 directed into the SAW element 5 is zero, the phase of the beat signal S detected by the photodetector 6 is coincident with the phase of the frequency change determined by the signal F′ having a frequency $\Omega E$ (FIG. 10) which is supplied to the SAW element 5. Accordingly, the phase of the signal S is deviated from the phase of the signal F′ supplied to the comb electrodes 51A and 51B. Thus, the phase difference between the beat signal S and the output signal F of the reference oscillator 80 also assumes a constant value, which can be regarded as zero.

If the OF ring 4 is provided with an angular rotation speed $\Omega_1$, a phase difference $\Delta\theta$ is generated between the LB1 and LB2. The phase difference between the beat signal S fed from the photodetector 6 and the output signal F of the reference oscillator 80 also changes by $\Delta\theta$. As a result, the comparison signal P fed from the phase comparator circuit 81 varies corresponding to $\Delta\theta$.

Thus, the frequency of the output signal Q of the VCO 82 is varied to control the shift time of the shift register 83. Accordingly, the phase difference between the signals F and F' is varied to change the phase of the SAW produced by the SAW element 5. Thus, control is so effected as to cancel the phase change $\Delta\theta$ of the beat signal S.

As a result, the phase of the signal F' is varied according to the phase difference generated between the LB1 and LB2. And control is so effected as to converge the phase difference between signals S and F of the phase comparator circuit 81 to zero. Thus, the phase detection operation is carried out by the so-called zero method. From the frequency of the output signal Q of the VCO 82, therefore, the phase difference between the LB1 and LB2, i.e., the angular rotation speed $\Omega_1$ can be measured with a predetermined precision under a sufficiently wide dynamic range.

Since almost all elements of the optical system apart from the OF ring 4 are included in the solid-state light wave guide substrate 3 in this embodiment, almost all assembly steps of the optical system required for constructing the ring interferometer are completed by carrying out the manufacturing process of the substrate 3. Thus, construction and adjustment of the interferometer are extremely simple. In addition, the optical axis hardly gets out of order in use.

The assembly substrate 9 (FIG. 4) and the coupling portion 10 will now be described.

Figure 11:
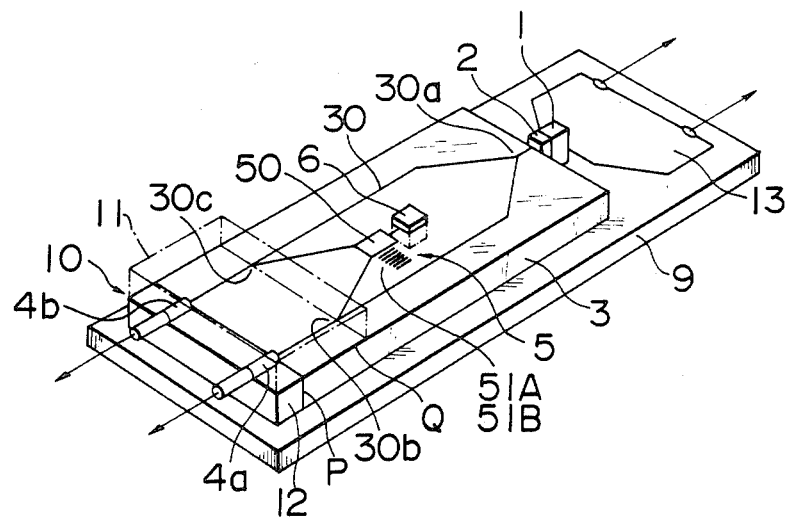
FIG. 11 is an oblique view of an embodiment of a solid-state interferometer according to the present invention.

FIG. 11 is an oblique view of one embodiment of the present invention. Reference numerals 11, 12 and 13 denote an OF holding member, a stop member, and an integrated circuit, respectively. The members 11 and 12 form the coupling portion 10.

As already described, the assembly substrate 9 is made of alumina ceramics, for example. In the integrated circuit 13 formed on one surface of the assembly substate 9, the buffer amplifier 7 and the phase modulation control circuit 8 have been integrated. On that surface of the assembly substrate 9, the laser 1, the isolator 2, and the solid-state light wave guide substrate 3 are mounted to form a unit. The solid-state light wave guide substrate 3 has the optical system required for the ring interferometer, which includes the light wave guide 30 formed in a predetermined shape, the SAW element 5, and the photodetector 6.

Figure 12:
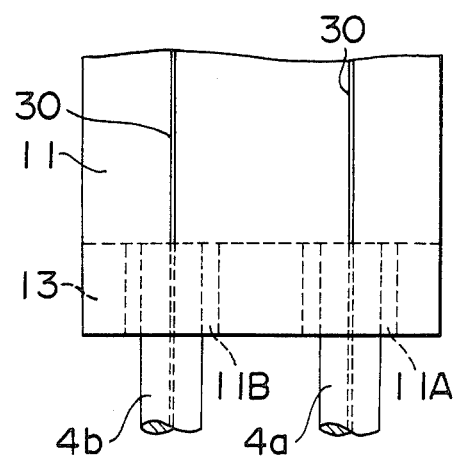
FIG. 12 is a drawing for illustrating an embodiment of a coupling portion.
Figure 12:
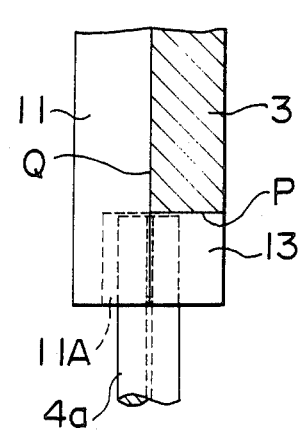
Figure 12:
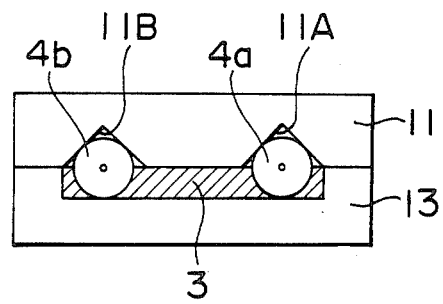

Before (or after) the solid-state light wave guide 3 is attached to the substrate 9, the ends 4a and 4b of the OF ring 4 are coupled to the solid-state light wave guide 3 via the coupling portion 10. Details of coupling are illustrated in FIG. 12.

The OF holding member 11 is made of a silicon plate. In a part of the OF holding member 11, V-shaped grooves 11A and 11B are formed to meet the incident ends of the light wave guide 30 formed on the solid-state light wave guide 3. The ends 4a and 4b of the OF with the jacket layer (used to guard the external surface of the clad layer) removed are inserted into the grooves 11A and 11B, and bound and held in the grooves by solder glass, for example. At this time, the grooves 11A and 11B are formed with high dimension precision. The distance between the core centers of two pieces of OF is made to be coincident with the distance between the light wave guides 30 formed on the solid-state light wave guide substrate 3 with predetermined precision. In addition, the core center of the OF is aligned with a surface of the member 11 which is attached to the solid-state light wave guide plate 3 with predetermined precision. As the processing method of the member 11, anisotropic silicon etching, for example, is used to process the V-shaped grooves 11A and 11B with high precision.

The stop member 12 is made of suitable glass and formed in a dent shape. When both ends of the stop member 12 are bound to the holding member 11, the stop member presses the ends 4a and 4b of two pieces of OF, which are inserted in the V-shaped grooves 11A and 11B of the holding member 11, against the V-shaped grooves 11A and 11B, respectively. Thereby, the OF is put between the member 12 and each of the V-shaped grooves 11A and 11B of the member 11 to be held in stable and reliable manner. By using the electrostatic bonding, i.e., anode bonding, for example, members 11 and 12 can be bound together with stability, high precision, and low thermal stress.

In this embodiment, therefore, the ends 4a and 4b of the OF are fixed to the holding member 11 and the stop member 12 is bound to the holding member 11. Then the holding member 11 is placed on a surface of the substrate 3, on which the SGL 30 is formed, so that an end face of the SLG substrate 3 and an end face of the stop member 12 may confront each other. An end face of the SLG substrate and an end face of the stop member 12 are adhered together closely. (This adhered portion is represented by "P" in FIGS. 11 and 12(b).) Only by sliding the holding member 11 with respect to the SLG substrate 3 while keeping the lower face of the holding member 11 adhered closely to the upper face of the SLG substrate 3 (as represented by Q), the optical axes of two pieces of SLG 30 formed on the SLG substrate can be aligned with those of the ends 4a and 4b of the OF attached to the holding member 11, respectively. Thus, the optical axis alignment with high precision can be easily conducted by simple work. After the optical axis alignment has been conducted by using the holding member 11 and the stop member 12 as guides, binding at portions P and Q is conducted by a suitable technique to fix the members 11 and 12 to the SLG substrate 3. In this way, construction and adjustment work is completed.

In the above described embodiments, the present invention has been aplied to a ring interferometer which is suitable to OF gyros, for example. It is a matter of course that the present invention can be applied to other kinds of interferometers.

Figure 13:
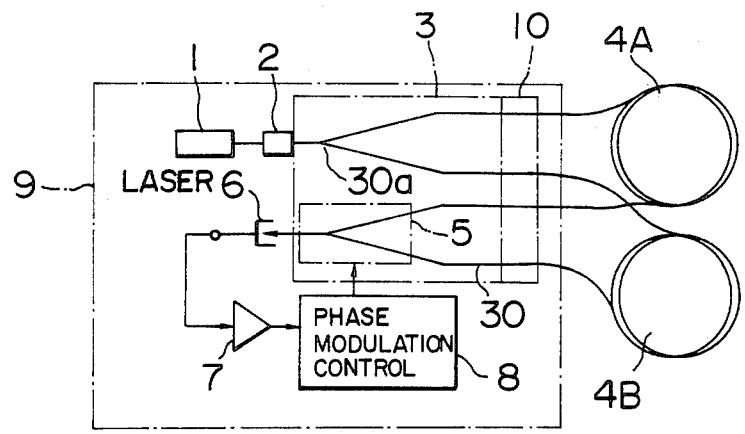
FIG. 13 shows the configuration of an embodiment of a Mach interferometer according to the present invention.

FIG. 13 shows an embodiment obtained by applying the present invention to the Mach interferometer. And FIG. 14 shows an embodiment obtained by applying the present invention to the Michelson interferometer.

Figure 2:
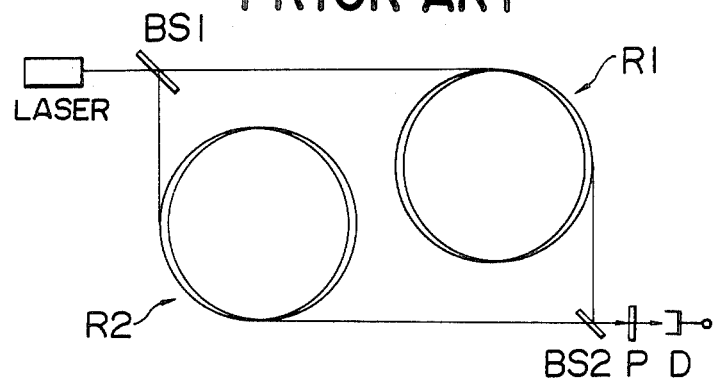
FIG. 2 shows the fundamental configuration of a conventional Mach interferometer.
Figure 3:
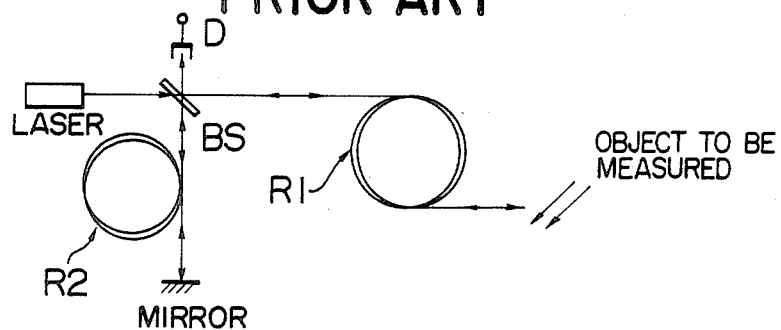
FIG. 3 shows the fundamental configuration of a conventional Michelson interferometer.
Figure 14:
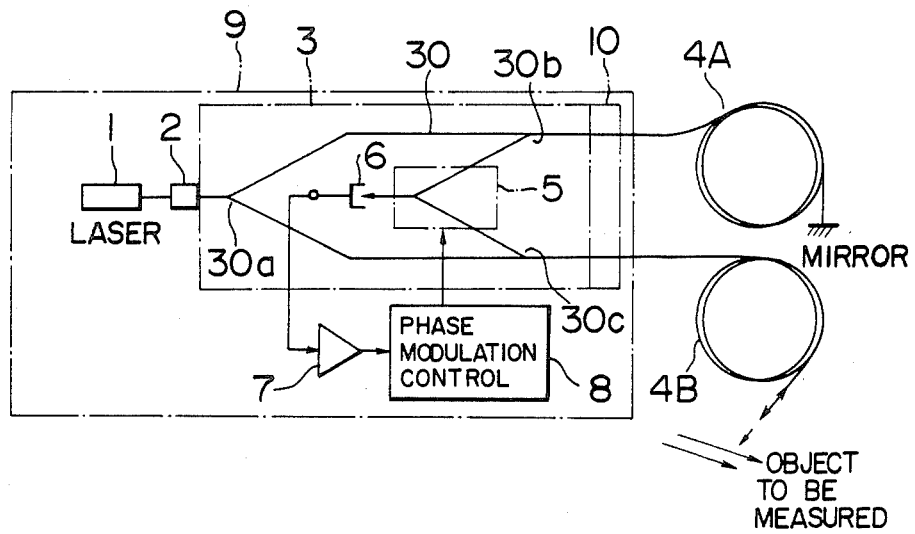
FIG. 14 shows the configuration of an embodiment of a Michelson interferomter according to the present invention.

In the embodiments of FIGS. 13 and 14, 4A and 4B are OF rings which correspond to the OF rings R1 and R2 illustrated in FIGS. 2 and 3. Remaining components in FIGS. 13 and 14 are the same as those in FIG. 4.

As the interferometer, the embodiment illustrated in FIGS. 13 and 14 operate in the same way as the embodiments illustrated in FIGS. 2 and 3. For measurement by the zero method, the embodiments illustrated in FIGS. 13 and 14 operate in the same way as the embodiment illustrated in FIG. 4. Accordingly, further description is omitted.

In the above described embodiments, the light beam splitting portion 30a and the light combination portion 30c formed on the SLG substrate 3 are simple branches. In the embodiments of the present invention, however, the light beam splitting portion and the light combination portion may be optic directional couplers formed by two pieces of SLG which run in parallel by a predetermined length with a predetermined short spacing.

As evident from the above explanation, the OF gyro using the ring interferometer demands a light beam having sufficient monochromatism and convergence. Therefore, the laser is mainly used as the light source.

On the other hand, the laser light has a high degree of coherency. If some reflection should exist within the optical system originating from the laser, a standing wave due to interference between the reflected light and the incident light appears between the part where reflection occurs and the laser. Thus, the oscillation mode of the laser is affected and the operation of the laser becomes unstable, resulting in the output error of the gyro.

In the embodiment of the present invention illustrated in FIG. 4 and the OF gyro using the ring interferometer illustrated in FIG. 1, therefore, some countermeasures must be taken against the problems caused by the occurrence of the standing wave. In one of countermeasures disclosed in the past, some loss is given to the resonance system in the laser to lower the coherency of the laser beam itself.

In that conventional method, however, the laser itself must be altered, resulting in the increased cost in many cases.

An example of a method for preventing occurrence of the gyro detection error caused by the standing wave will now be described.

Figure 15:
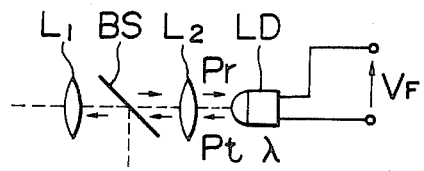
FIG. 15 is a drawing for illustrating a standing wave caused by laser coherency.

FIG. 15 illustrates how the standing wave is generated. A laser light Pt having a wavelength λ which is sent out from a laser diode LD is directed into an optical system of an interferometer including lenses $L_1$ and $L_2$ as well as a beam splitter BS and is used for measurement. This optical system is composed of the SLG and OF in the embodiment of FIG. 4.

If some part of the optical system has a discontinuity face in refractive index, a reflected light Pr is generated to produce the above described standing wave.

Figure 16:
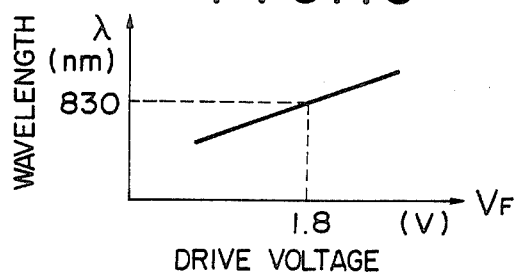
FIG. 16 is an operation characteristic diagram of semiconductor laser.

On the other hand, the wavelength λ of the laser light Pt can be varied by changing the drive voltage $V_F$ of the laser diode LD as illustrated in FIG. 16.

Figure 17:
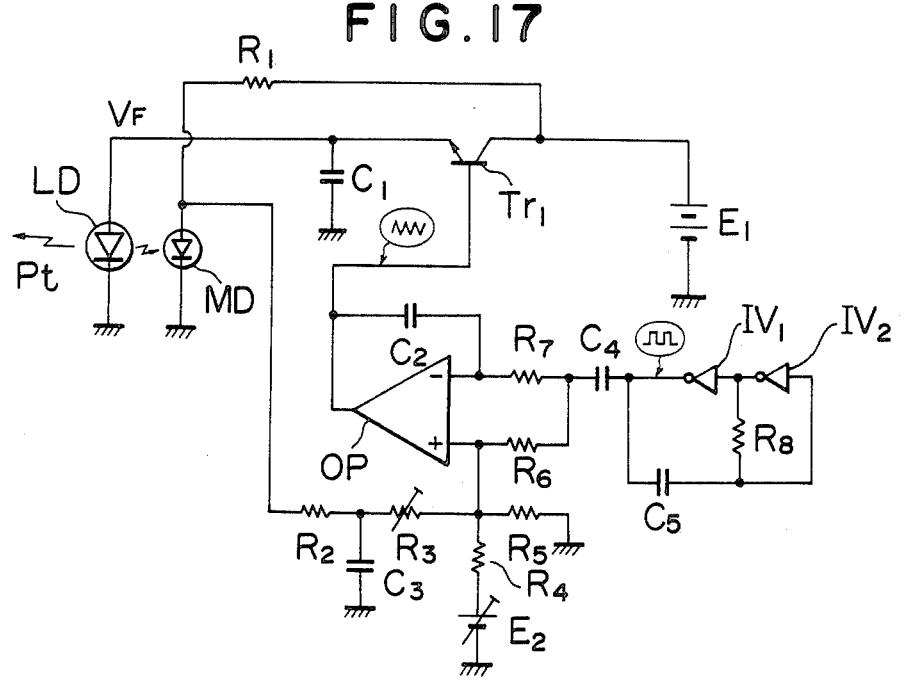
FIG. 17 is a circuit diagram of an example of a laser activation circuit which prevents occurrence of a standing wave.

In this method, the wavelength λ of the laser light Pt emitted from the laser diode LD is always varied only slightly by utilizing the characteristics of the laser diode LD as illustrated in FIG. 16 in order to prevent the occurrence of the standing wave. One embodiment of the method is illustrated in FIG. 17.

A transistor $Tr_1$ functions to vary voltage $V_F$ fed to the laser diode LD in accordance with the base voltage thereof. A capacitor $C_1$ is provided for noise suppression.

An operational amplifier OP constitutes an integration circuit in conjunction with a capacitor $C_2$ and a resistor $R_7$. The output of the integration circuit functions to control the transistor $Tr_1$.

Inverters $IV_1$ and $IV_2$ constitute an astable multivibrator in conjunction with a capacitor $C_5$ and a resistor $R_8$. The multivibrator functions to supply a square wave to the operational amplifier OP via a capacitor $C_4$.

When the circuit of FIG. 17 is activated, the square wave generated by the inverters $IV_1$ and $IV_2$ is integrated by the operational amplifier OP to produce a triangular wave. Since the transistor $Tr_1$ is controlled by the triangular wave, the voltage $V_F$ fed to the laser diode LD varies in the triangular form. Since the wavelength λ of the laser light Pt is always varied over a predetermined range, no standing wave is generated even if the reflected wave Pr emerges. Thus, it becomes possible to prevent occurrence of a gyro detection error without applying any countermeasure to the laser diode.

Further, in the embodiment illustrated in FIG. 17, the output of a monitor diode MD associated with the laser diode LD is smoothed by resistors $R_2$ and $R_3$ as well as a capacitor $C_3$ and supplied to the + input of the operational amplifier OP. Thus, the drive voltage $V_F$ is so controlled in accordance with the intensity of the laser light Pt emitted from the laser diode LD as to hold constant the intensity of the output laser light. As a result, the laser light output is stabilized.

The monitor diode MD is a kind of photodiode and a resistor $R_1$ is the load resistor of the monitor diode MD.

The voltage $E_2$ is provided for setting the DC bias for hte laser diode LD. Resistor $R_4$, $R_5$ and $R_6$ are provided for level setting.

In an OF gyro using such a ring interferometer, the output is not completely zero but always drift slightly near zero level, even if the angular rotation velocity to be detected is zero.

Figure 18:
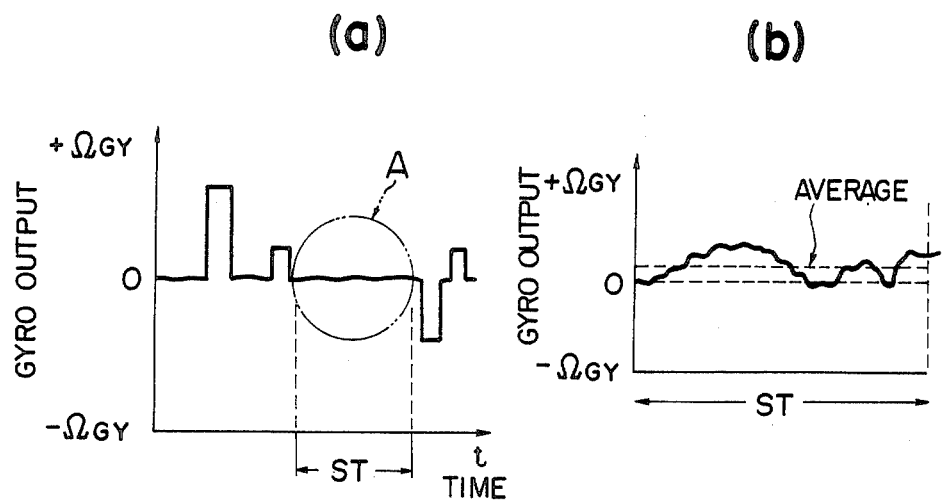
FIG. 18 shows drawings for illustrating the drift in an optical fiber gyro.

If such an OF gyro is used in an automobile navigation system, therefore, the output ΩGY does not assume zero even in a period ST during which the car stops and the angular rotation speed fed to the gyro is zero, as illustrated in FIG. 18(a). As expanded in FIG. 18(b), the average value is not zero. The deviation of the average value from zero might be increased as the stoppage-period ST is increased.

When a car of this nevigation system restarts after stoppage time, the departure direction also depends upon the output of the gyro. If the average value is deviated from zero at stoppage time as described above, the departure direction gets out of order, resulting in a large position error.

Figure 19:
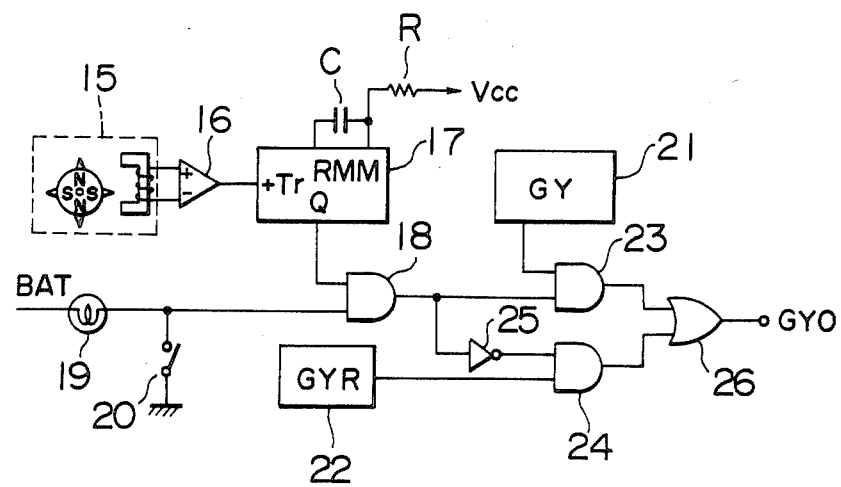
FIG. 19 is a circuit diagram for illustrating an example of a method used to eliminate the effect of the drift.

FIG. 19 shows an example of a circuit which is expected to bring about a favorable result when applied to the present invention.

The circuit illustrated in FIG. 19 includes a car velocity sensor 15, a comparator 16, a retriggerable monostable multivibrator (hereafter referred to as RMM) 17, a digital AND gate 18, a hand brake lamp 19, a hand brake switch 20, an OF gyro 21, a gyro reference signal generator (hereafter referred to as GYM) 22, AND gates 23 and 24, an inverter 25, and an OR gate 26.

The car velocity sensor 15 functions to measure the car velocity and detect the car stoppage. For example, a well known sensor composed of a plurality of magnets attached to the thrust shaft of the car and magnetic flux detection coils may be used.

A comparator 16 functions to convert the output of the car velocity sensor 15 into pulses. While the car is running, therefore, pulses appear at the output of the comparator 16 with a repetition period corresponding to the car velocity.

The RMM 17 operates with a time constant predetermined by a capacitor C and a resistor R. As long as the comparator 16 supplies pulses to the RMM 17 within a predetermined repetition period defined by the time constant, the output Q of the RMM 17 continues to be "1".

One end of the hand brake lamp 19 is connected to a battery BAT. The other end of the lamp 19 is connected to the switch 20 which is closed when the hand brake is pulled.

The GYR 22 functions to produce a reference signal which indicates that the angular velocity Ω is zero.

Operation of the circuit illustrated in FIG. 19 will now be described.

While the car is running, the car velocity sensor 15 produces its output. Since the RMM 17 is thus continuously triggered by the output pulse of the comparator 16, the output Q continues to be "1".

While the car is running, the hand brake is also loosened, the hand brake switch 20 being in the open state. Accordingly, the upper terminal of the switch 20 is held to the power supply voltage to indicate the state "1".

Accordingly, the output of the AND gate 18 assumes state "1" to enable the AND gate 23. On the other hand, the AND gate 24 remains to be closed because of existence of the inverter 25.

While the car is running, therefore, the angular rotation velocity signal fed from the OF gyro 21 is sent out as the gyro output GYO as it is via the AND gate 23 and the OR gate 26, thereby the navigation system being activated.

When the car is stopped, the output of the car velocity sensor 15 disappears. Since the pulses fed from the comparator 16 are also removed, the Q output of the RMM 17 turns "0" after a predetermined time defined by the CR time constant has elapsed. Thereby, the output of the AND gate 18 also turns "0".

When the hand brake is pulled, the hand brake switch 20 is closed. The hand brake lamp 19 is lit. One input of the AND gate 18 is grounded through the switch 20 to change from "1" to "0". The output of the AND gate 18 is held to "0" by the input as well.

At this time, therefore, the AND gate 23 is closed. On the other hand, the AND gate 24 is enabled by the output of the inverter 25. Thus, the reference signal representing zero angular velocity fed from the GYR 22 is sent out as the gyro output GYO, the navigation system being activated.

In summary, the detection signal of the OF gyro 21 is sent as it is to the navigation system to be used for position detection, for example, while the car is running. When the car stops and the angular rotation speed Ω becomes zero, the reference signal indicating zero speed is sent to the navigation system. As a result, it is possible to prevent direction setting at the time of car departure from getting out of order because of the output drift of the OF gyro 21. And the position can be correctly measured at all times.

Figure 20:
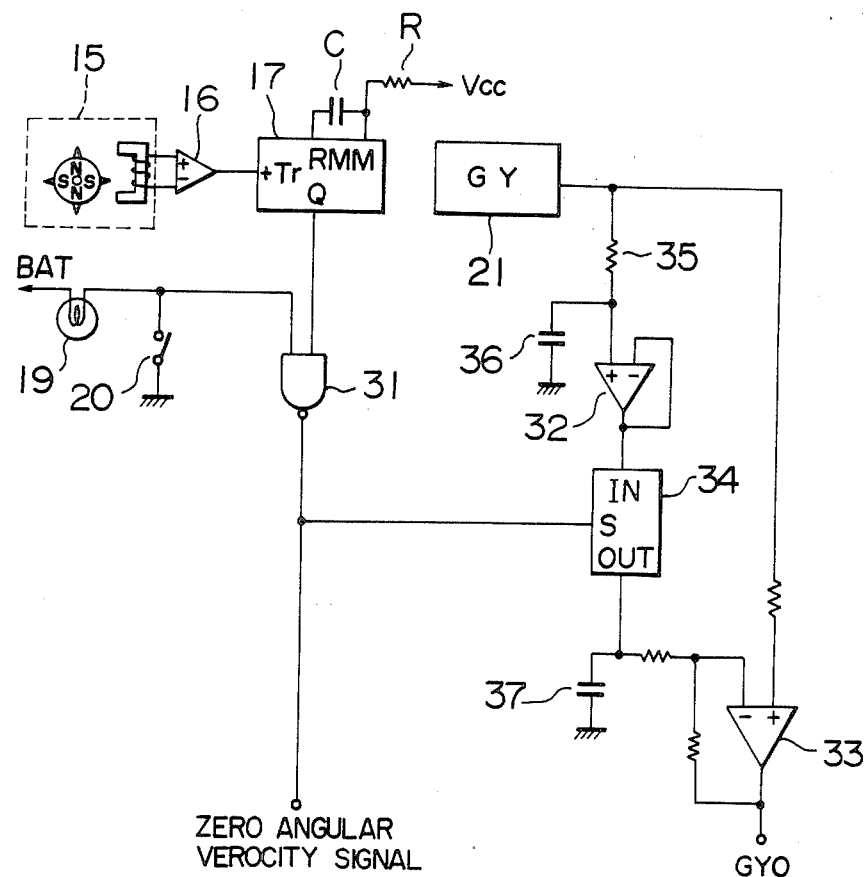
FIG. 20 is a circuit diagram for illustrating another example of a method used to eliminate the effect of the drift.

FIG. 20 shows another example of a circuit attaining the same object as FIG. 19. In the circuit of FIG. 19, the reference value is sent out instead of the output of the gyro during the stoppage time. Meanwhile, every time the car stops, the output of the OF gyro in the circuit of FIG. 20 during stoppage becomes the zero level of a new angular rotation speed when the car restarts. Thereby, occurrence of error in the navigation system is prevented. A car velocity sensor 15, a comparator 16, an RMM 17, a hand brake lamp 19, a hand brake switch 20, and an OF gyro are the same as those included in the circuit of FIG. 19. Therefore, the output of the NAND gate 31 turns "0" only while the car is running. When the car stops to remove the output of the car velocity sensor 15 and/or the hand brake is pulled to close the switch 20, the output of the NAND gate turns "1", which can be used as the angular velocity detection signal.

In the circuit of FIG. 20, operational amplifiers 32 and 33, an analog switch 34, an integrating resistor 35, an integrating capacitor 36, and a data hold capacitor 37 are also included.

The operational amplifier 32 operates as a buffer amplifier. When the analog switch 34 turns on, the amplifier 32 functions to transfer the voltage appearing at the capacitor 36 to the capacitor 37.

The operational amplifier 33 amplifies the output of the OF gyro 21 with respect to the voltage of the capacitor 37 fed to its minus input. The amplifier 33 functions to set the zero level of the output of the OF gyro 21 to the voltage of the capacitor 37.

The analog switch 34 turns on when the output of the NAND gate 31 is "1" and turns off when the output of the NAND gate 31 is "0".

The associated navigation system acquires the output of the NAND gate 31 as the zero angular velocity signal. When the output of the NAND gate 31 turns on, the gyro output GYO is recognized as the signal when the angular rotation speed Ω is zero.

Operation of the circuit illustrated in FIG. 20 will now be described.

An integration circuit composed of the resistor 35 and the capacitor 36, which may be considered to be a low-pass filter, always makes smooth the output of the OF gyro 21. The smoothed output is supplied to the operational amplifier 32 functioning as a buffer amplifier. When the car is stopped and the angular rotation velocity Ω is zero, therefore, the average value of change caused by the drift of the OF gyro 21 as illustrated in FIG. 18(b) always appear at the output of the operational amplifier 32.

As a result, every time the car stops and the output of the NAND gate 31 turns "1" to turn on the analog switch 34, the voltage across capacitor 37 is updated by an average value of new drift of the OF gyro 21. The updated voltage becomes the zero level of the gyro output GYO by the function of the operational amplifier 33.

Even if the car stops and the average level of the OF gyro output changes due to drift, therefore, the zero level of the gyro output is always compensated automatically by the changed average level in this circuit. Thus, error in detection operation is prevented from occurring in the navigation system. In the circuit of FIG. 20, the output of the OF gyro is an analog signal. When the circuit of FIG. 20 is applied to the embodiment of FIG. 4, the frequency output must be converted into an analog signal by using a frequency discrimination circuit, for example.

In a navigation system using such an OF gyro, a microcomputer is generally used for signal processing. And the angular velocity is represented by the frequency of the gyro output in the embodiment illustrated in FIG. 4.

In such a case, an example of a method for calculating the average value of drift as illustrated in FIG. 18(b) wil now be described.

Figure 21:
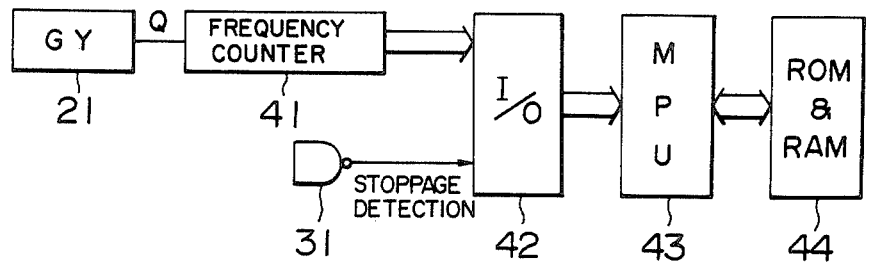
FIG. 21 is a block diagram of an example of a circuit for detecting the average of drift by means of a microcomputer.

FIG. 21 shows the schematic block diagram of the signal processing part of a microcomputer. A frequency counter 41, an input/output device (I/O) 42, an MPU 43 of the microprocessor, and a memory 44 are included in FIG. 21. An OF gyro 21 may be, for example, one embodiment of the present invention illustrated in FIG. 4, in which the angular rotation velocity detection signal is a frquency signal. A NAND gate 31 is the same as that in the circuit of FIG. 20.

The frequency counter 41 always counts the output Q of the OF gyro 21 to send out its frequency data.

On the other hand, the MPU 43 monitors the output of the NAND gate 31 via the I/O 42. Each time the output of the gate 31 changes from "0" to "1", i.e., each time the car stoppage is detected, the MPU 43 starts execution of a series of processing steps as illustrated in a flow chart of FIG. 22.

Figure 22:
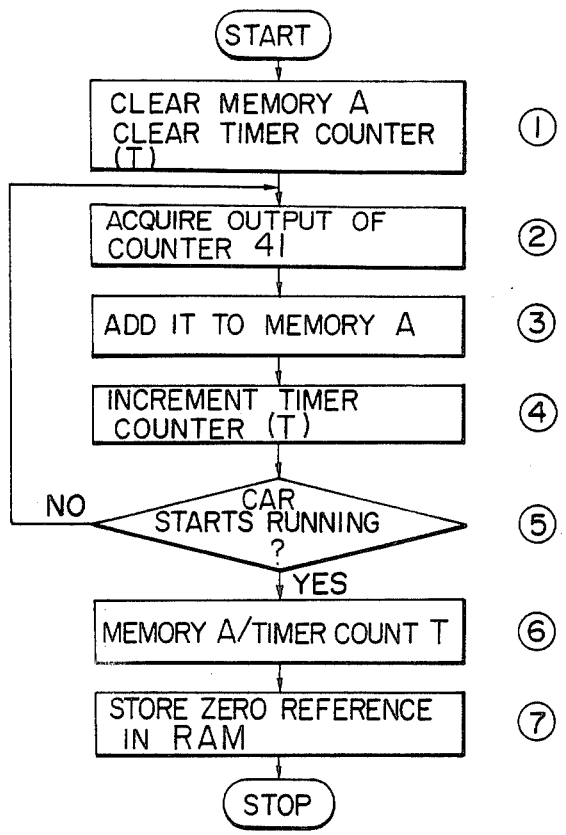
FIG. 22 is a flow chart for the circuit illustrated in FIG. 21.

After the processing of FIG. 22 is started, predetermined memory area A and timer counter (T) which are prepared in the RAM of the memory 44 beforehand are cleared at step ①. The timer counter (T) is also a soft counter using a predetermined memory area of the RAM.

The output data of the frequency counter 41 is acquired at step ② and added to the above described memory area A at at step ③. At step ④, the timer counter (T) is incremented.

At step 5 , it is determined whether the car starts runing or not. If the result is "NO", processing returns to the step ② and steps ② to ④ are repeated. If the result at the step ⑤ is "YES", processing proceeds to the step ⑥, where the data in the memory is divided by the count value T of the timer counter to yield the average value. At the step ⑦, the average value thus computed is stored in the RAM as the zero reference data. Thereafter, the processing illustrated in FIG. 22 is terminated. At the step ⑤, the car is considered to have started running if the output of the NAND gate 31 is "0".

It the steps ② to ⑤ repeated at a predetermined time interval, the drift value averaged over the car stoppage period, i.e., the zero reference data can be obtained.

A general method for aquiring the angular rotation velocity data from the OF gyro in the navigation system using such a microcomputer will now be described.

Figure 23:
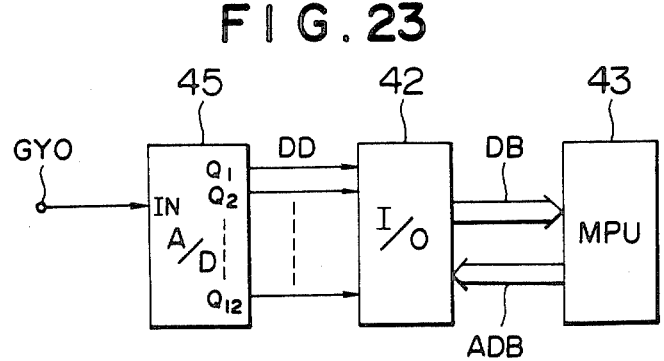
FIG. 23 is a block diagram for illustrating an example of a readout method when the output of the gyro is analog data.

If the OF gyro is one which outputs the angular rotation speed signal in the form of analog data, the data GYO may be acquired into the MPU 43 simply via an analog-digital converter (A/D) 45 as illustrated in FIG. 23.

Figure 24:
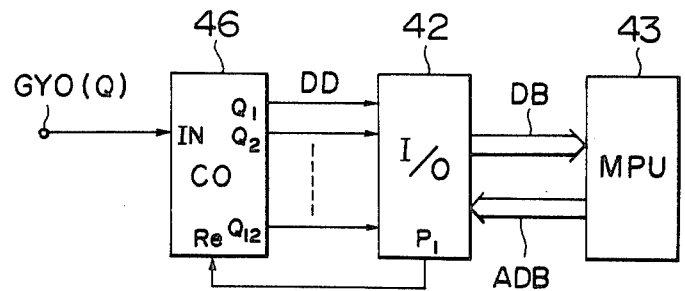
FIG. 24 is a block diagram for illustrating an example of a readout method when the output of the gyro is digital data.

If the OF gyro is one which outputs the angular rotation speed signal in the form of frequency data Q as the embodiment of the present invention illustrated in FIG. 4, the frequency data Q must be converted into digital data DD by using a frequency counter 46 before acquiring data into the MPU 43 as illustrated in FIG. 24. In an alternative method, the frequency data Q is acquired into the MPU 43 and processed by soft count means. In this case, however, a large part of processing time of MPU 43 is occupied by the soft count processing. Accordingly, it is more desirable to provide an external frequency counter 46 as illustrated in FIG. 24.

In FIGS. 23 and 24, the A/D 45 and the frequency counter 46 have a capacity of 12 bits, and the length of digital data DD is 12 bits. The reason will now be described.

Figure 25:
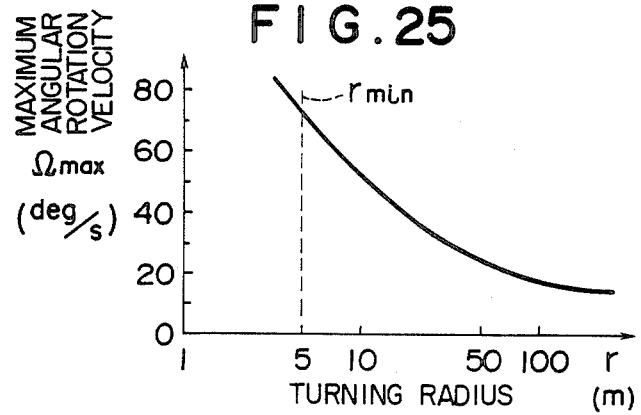
FIG. 25 is a curve diagram for representing the angular rotation velocity of an automobile as a function of its turning radius.

While the car is running, the maximum speed at which the car can turn safely without skidding is defined by:

$$m \frac{V^2}{r} = mgC_f \tag{5}$$

where
  m = weight of the car
  V = velocity of the car
  r = turning radius of the car
  g = acceleration of gravity
  $C_f$ = coefficient of friction between car tire and road surface FIG. 25 shows the maximum angular rotation speed $\Omega$max of the car, which can be obtained at a speed satisfying the expression (4), as a function of the turning radius. The friction coefficient Cf is assumed to be 0.8 in FIG. 25. Assuming the minimum possible turning radius $r_{min}$ of the car is 5 m, the maximum value of the angular rotation velocity $\Omega$ to be detected by the OF gyro in the navigation system is approximately 70 deg/S as evident from FIG. 25.

On the other hand, the minimum value of the angular rotation velocity to be detected by the OF gyro is not yet definite when viewed from the navigation system side. Since the minimum detection precision of the OF gyro is approximately 0.05 deg/S, however, it is supposed to be the minimum value.

Thus, the dynamic range of the angular rotation speed data required for the navigation system becomes 1,400. For representing the dynamic range by binary data, 11 bits are required. In addition, one bit is required for determining the rotation direction. As a result, 12 bits are required for the data of the OF gyro. That is the reason why the 12-bit digital data DD is used in FIGS. 23 and 24.

How to mount the OF gyro will now be described.

The solid-state interferometer according to the present invention is suitable to the OF gyro and hence is expected to be applied to the automobile navigation system in many cases. In these cases, the OF gyro must be mounted on the car.

Since the OF gyro is sensitive to a temperature change and a stress change, it is difficult to mount the OF gyro in the engine room of the car. For practical use, the OF gyro can be mounted on positions illustrated in FIG. 26.

Figure 26:
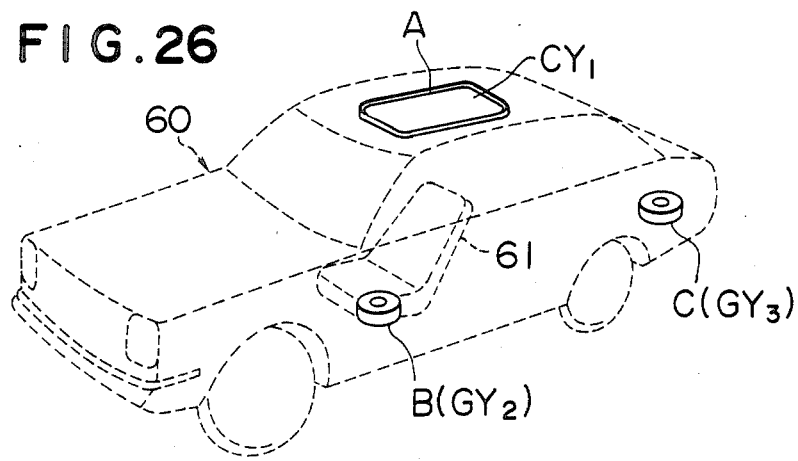
FIG. 26 is a drawing for illustrating a position at which an optical fiber gyro is mounted.

In FIG. 26, reference numeral 60 denotes the entire car and reference numeral 61 denotes one of seats.

The first mounting position A is located on the roof of the car 60. An OF gyro mounted on this position is represented by $GY_1$. Since a large-sized OF ring is permitted on this position, the sensitivity of the OF gyro can be raised. However, the temperature rise of the roof in summer might cause problems.

The second mounting position B is located beneath a seat 61. An OF gyro mounted on this position is represented by $GY_2$.

The third mounting position C is located in the trunk room of the car 60. An OF gyro mounted on this position is represented by $GY_3$.

It is difficult to say which of positions B and C is better. This problem requires further examination.

In most of description, it has been assumed that a solid-state interferometer according to the present invention is used as the OF gyro and the OF gyro is applied to an automobile navigation system. This OF gyro is effective in position detection of a moving object and in attitude detection. Accordingly, this OF gyro is useful not only to the automobile navigation system but also to control units such as an industrial robot or various manipulators.

Owing to the present invention as described before, the optical system including the optical modulator can be solidified on one substrate apart from the OF ring. Thus, it is possible to provide a solid-state interferometer which has no drawbacks of the prior art, which can be produced in a small-sized modular form, which only requires extremely simple construction and adjustment, which exhibits little charactristics change in use, which can be used as an OF gyro operating stably with high precision, and which is low in cost.

Although the invention has been described in its preferred form with a certain degree of particularity, it is understood that the present disclosure of the preferred form has been changed in the details of construction, and the combination and arrangement of parts may be modified without departing from the spirit and the scope of the invention as hereinafter claimed.

We claim:

1. A solid-state optical interferometer comprising:
   a loop-shaped optical fiber having end portions;
   a solid-state light wave guide optically coupled to said optical fiber, said solid-state light wave guide forming a light path in conjunction with said optical fiber for enabling mixing of light received from the end portions of said optical fiber;
   electrodes for producing a surface acoustic wave (SAW), said surface acoustic wave being used to apply optical modulation to a light beam passing through said solid-state light wave guide, said electrodes being formed as a pair on a surface of a substrate on which said solid-state light wave guide is formed;
   said solid-state light wave guide formed on said substrate including two pieces of input light wave guides arranged on said substrate so as to form a predetermined angle therebetween, and at least one piece of output light wave guide coupled to said two pieces of input light wave guides, light beams fed from said two pieces of input light wave guides being recombined into an interference beam by said surface acoustic wave (SAW), said interference beam being sent out through said at least one piece of output light wave guide;
   a detector circuit for detecting a direction change of a car by utilizing said interference beam; and
   a circuit for correcting a change generated in the output of said detector circuit while the car is not running.

2. A solid-state optical interferometer according to claim 1, wherein said electrodes formed on said substrate are connected to an optical modulation oscillator unit, and the oscillation output of said oscillator unit is so controlled by said interference beam as to cancel a change in phase produced by said recombination of said interference beam.

3. A solid-state optical interferometer according to claim 1, further comprising a laser beam generating circuit for feeding a laser beam to said light path, said laser beam generating circuit comprising a circuit for always changing the wavelength of said laser beam so as to prevent a standing wave from appearing in said light path.

4. A solid-state optical interferometer according to claim 1, wherein the end portions of said loop-shaped optical fiber include first and second end portions respectively coupled to first and second light wave guide portions at confronting end surfaces thereof, said solid-state light wave guide including a holding member having V-shaped grooves formed therein for receiving the end portions of said loop-shaped optical fiber therein, the end portions of said loop-shaped optical fiber being fixedly secured within said grooves.

5. A solid-state optical interferometer according to claim 4, wherein said V-shaped grooves are anisotropic silicon etched grooves, and said solid-state light wave guide includes portions coupled together by electrostatic bonding.

6. A solid-state interferometer comprising:
   a loop-shaped optical fiber having end portions;
   a solid-state light wave guide optically coupled to said optical fiber, said solid-state light wave guide forming a light path in conjunction with said optical fiber for enabling mixing of light received from the end portions of said optical fiber;
   electrodes for producing a surface acoustic wave (SAW), said surface acoustic wave being used to apply optical modulation to a light beam passing through said solid-state light wave guide, said electrodes being formed as a pair on a surface of a substrate on which said solid-state light wave guide is formed;
   said solid-state light wave guide formed on said substrate including two pieces of input light wave guides arranged on said substrate so as to form a predetermined angle therebetween; and at least one piece of output light wave guide coupled to said two pieces of input light wave guides, light beams fed from said two pieces of input light wave guides being recombined into an interference beam by said surface acoustic wave (SAW), said interference beam being sent out through said at least one piece of output light wave guide;
   a detector circuit for detecting a direction change of a car by utilizing said interference beam; and
   a circuit for averaging a change generated in the output of said detector circuit while the car is not running.

7. A soild-state optical interferometer according to claim 6, wherein said electrodes formed on said substrate are connected to an optical modulation oscillator unit, and the oscillation output of said oscillator unit is so controlled by said interference beam as to cancel a change in phase produced by said recombination of said interference beam.

8. A solid-state optical interferometer according to claim 6, further comprising a laser beam generating circuit for feeding a laser beam to said light path, said laser beam generating circuit comprising a circuit for always changing the wavelength of said laser beam so as to prevent a standing wave from appearing in said light path.

9. A solid-state optical interferometer according to claim 6, wherein the end portions of said loop-shaped optical fiber include first and second end portions respectively coupled to first and second light wave guide portions at confronting end surfaces thereof, said solid-state light wave guide including a holding member having V-shaped grooves formed therein for receiving the end portions of said loop-shaped optical fiber therein, the end portions of said loop-shaped optical fiber being fixedly secured within said grooves.

10. A solid-state optical interferometer according to claim 9, wherein said V-shaped grooves are anisotropic silicon etches grooves, and said solid-state light wave guide includes portions coupled together by electrostatic bonding.

* * * * *